(12) United States Patent
Mei et al.

(10) Patent No.: US 11,675,729 B2
(45) Date of Patent: Jun. 13, 2023

(54) ELECTRONIC DEVICE AND OPERATION METHOD OF SLEEP MODE THEREOF

(71) Applicant: Shanghai Zhaoxin Semiconductor Co., Ltd., Shanghai (CN)

(72) Inventors: Yixing Mei, Beijing (CN); Yongfeng Song, Beijing (CN); Xuemin Zhang, Shanghai (CN); Xiaoliang Ji, Beijing (CN); Shuai Zhang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/506,144

(22) Filed: Oct. 20, 2021

(65) Prior Publication Data

US 2023/0102085 A1    Mar. 30, 2023

(30) Foreign Application Priority Data

Sep. 28, 2021  (CN) .......................... 202111141627.5
Sep. 28, 2021  (CN) .......................... 202111142578.7
(Continued)

(51) Int. Cl.
*G06F 13/42*    (2006.01)
*H04L 45/02*    (2022.01)
(Continued)

(52) U.S. Cl.
CPC ........ *G06F 13/4265* (2013.01); *G06F 1/3234* (2013.01); *G06F 9/4418* (2013.01);
(Continued)

(58) Field of Classification Search
CPC .... G06F 9/4418; G06F 9/4812; G06F 1/3234; G06F 13/4027; G06F 13/4282;
(Continued)

(56) References Cited

U.S. PATENT DOCUMENTS 9,929,928 B1  3/2018 Dekoos
10,339,059 B1  7/2019 Mattina
(Continued)

OTHER PUBLICATIONS

Notice of Allowance dated Oct. 26, 2022, issued in U.S. Appl. No. 17/511,800.
(Continued)

*Primary Examiner* — Nimesh G Patel
(74) *Attorney, Agent, or Firm* — McClure, Qualey & Rodack, LLP

(57) ABSTRACT

An operation method of a sleep mode of an electronic device includes the following steps. A first sub-module of a first module sends a sleep command to a second sub-module of the first module and a third sub-module and a fourth sub-module of a second module, wherein the first sub-module includes first and second modes, the second sub-module includes third and fourth nodes, the third sub-module includes fifth and sixth nodes, and the fourth sub-module includes seventh and eighth nodes. The second sub-module, the third sub-module and fourth sub-module execute a sleep sequence in sequence to enter a sleep mode according to the sleep command. The first node sends the sleep command to the second node to execute the sleep sequence to enter the sleep mode. The first node sends the sleep command to the first node to execute the sleep sequence to enter the sleep mode.

19 Claims, 10 Drawing Sheets

(30) Foreign Application Priority Data

Sep. 28, 2021 (CN) .......................... 202111142579.1
Sep. 28, 2021 (CN) .......................... 202111142604.6

(51) Int. Cl.

| | |
|---|---|
| H04L 45/00 | (2022.01) |
| H04L 45/745 | (2022.01) |
| H04L 45/42 | (2022.01) |
| G06F 15/78 | (2006.01) |
| G06F 13/40 | (2006.01) |
| H04L 1/00 | (2006.01) |
| H04L 69/324 | (2022.01) |
| G06F 1/3234 | (2019.01) |
| G06F 9/4401 | (2018.01) |
| G06F 9/48 | (2006.01) |
| G06F 13/16 | (2006.01) |

(52) U.S. Cl.
CPC ........ *G06F 9/4812* (2013.01); *G06F 13/1668* (2013.01); *G06F 13/4027* (2013.01); *G06F 13/4068* (2013.01); *G06F 15/7807* (2013.01); *G06F 15/7825* (2013.01); *H04L 1/004* (2013.01); *H04L 45/02* (2013.01); *H04L 45/22* (2013.01); *H04L 45/42* (2013.01); *H04L 45/745* (2013.01); *H04L 69/324* (2013.01); *G06F 13/4208* (2013.01); *G06F 13/4282* (2013.01)

(58) Field of Classification Search
CPC ............. G06F 13/4265; G06F 13/1668; G06F 13/4068; G06F 15/7807; G06F 15/7825; G06F 13/4208; H04L 1/004; H04L 45/02; H04L 45/22; H04L 45/42; H04L 45/745; H04L 69/324
See application file for complete search history.

(56) References Cited

U.S. PATENT DOCUMENTS

| | | |
|---|---|---|
| 10,505,851 B1 | 12/2019 | Matthews et al. |
| 11,526,460 B1 | 12/2022 | Wang et al. |
| 11,569,939 B1 | 1/2023 | Krishnamurthy et al. |
| 2003/0225737 A1 | 12/2003 | Matthews |
| 2008/0209298 A1 | 8/2008 | Chae |
| 2010/0002589 A1 | 1/2010 | Ciordas et al. |
| 2010/0191894 A1 | 7/2010 | Bartley et al. |
| 2013/0057338 A1* | 3/2013 | Venkatraman ..... H03K 19/0016 327/564 |
| 2014/0177473 A1 | 6/2014 | Kumar et al. |
| 2015/0263949 A1 | 9/2015 | Roch et al. |
| 2016/0239461 A1 | 8/2016 | Kavipurapu |
| 2017/0060212 A1* | 3/2017 | Kaushal ................ G06F 1/3287 |
| 2017/0171618 A1 | 6/2017 | Fryer et al. |
| 2017/0185449 A1 | 6/2017 | Zhang et al. |
| 2018/0189222 A1 | 7/2018 | Srivastava |
| 2018/0276139 A1 | 9/2018 | Wysoczanski et al. |
| 2019/0044916 A1 | 2/2019 | Jones |
| 2020/0153757 A1 | 5/2020 | Bharadwaj et al. |
| 2020/0326771 A1* | 10/2020 | Wu ....................... G06F 1/3287 |
| 2020/0393891 A1* | 12/2020 | Baggett ................ G06F 1/3234 |
| 2021/0306257 A1 | 9/2021 | Dutta |
| 2022/0019552 A1 | 1/2022 | Wilkinson et al. |
| 2022/0045948 A1 | 2/2022 | Shen et al. |

OTHER PUBLICATIONS

Saponara, S., et al.; "Configurable network-on-chip router macrocells;" Microprocessors and Microsystems 45; 2016; pp. 141-150.

Wang, N., et al.; "Traffic Allocation: An Efficient Adaptive Network-on-Chip Routing Algorithm Design;" 2nd IEEE International Conference on Computer and Communications; 2016; pp. 2015-2019.

Non-Final Office Action dated Mar. 16, 2023, issued in U.S. Appl. No. 17/523,049.

Non-Final Office Action dated Mar. 27, 2023, issued in U.S. Appl. No. 17/506,124.

* cited by examiner

ELECTRONIC DEVICE AND OPERATION METHOD OF SLEEP MODE THEREOF

CROSS REFERENCE TO RELATED APPLICATIONS

This application claims priority of China Patent Application No. 202111142604.6, China Patent Application No. 202111142578.7, China Patent Application No. 202111141627.5, and China Patent Application No. 202111142579.1, filed on Sep. 28, 2021, the entirety of which is incorporated by reference herein.

BACKGROUND OF THE INVENTION

Field of the Invention

The present invention relates to an electronic device and an operation method thereof, and in particular, relates to an electronic device and an operation method of a sleep mode thereof.

Description of the Related Art

Generally, an electronic device (such as a server system) has a high demand on the number of cores, memory capacity, and hard disk capacity of a central processing unit (CPU). In order to meet the above requirements, electronic devices are designed with a complex structure with multiple interconnected central processing units.

Therefore, how to design an effective sleep function for an electronic device with a complex structure has become a focus for technical improvements by various manufacturers.

BRIEF SUMMARY OF THE INVENTION

The present invention provides an electronic device and an operation method of the sleep mode thereof, so that the design of the sleep function may be achieved in the electronic device with a complex structure, so as to increase the convenience of use.

The present invention provides an operation method of a sleep mode of an electronic device, which includes the following steps. A first sub-module of a first module is used to send a sleep command to a second sub-module of the first module, a third sub-module of a second module and a fourth sub-module of the second module, wherein the first sub-module includes a first node and a second node, the second sub-module includes a third node and a fourth node, the third sub-module includes a fifth node and a sixth node, and the fourth sub-module includes a seventh node and an eighth node. The second sub-module, the third sub-module and the fourth sub-module execute a sleep sequence in sequence to enter a sleep mode according to the sleep command. The first node is used to send the sleep command to the second node, and the second node executes the sleep sequence to enter the sleep mode. The first node is used to send the sleep command to the first node, and the first node executes the sleep sequence to enter the sleep mode.

The present invention additionally provides an electronic device, which includes a first module and the second module. The first module includes a first sub-module and a second sub-module. The first sub-module includes a first node and a second node. The second node is connected to the first node. The second sub-module includes a third node and a fourth node. The third node is connected to the second node. The fourth node is connected to the third node and the first node. The second module includes a third sub-module and a fourth sub-module. The third sub-module includes a fifth node and a sixth node. The fifth node is connected to the second node. The sixth node is connected to the fifth node and the first node. The fourth sub-module includes a seventh node and an eighth node. The seventh node is connected to the sixth node and the fourth node. The eighth node is connected to the seventh node, the third node and the fifth node. The first sub-module sends a sleep command the second sub-module, the third sub-module and the fourth sub-module, and the second sub-module, the third sub-module and the fourth sub-module executing a sleep sequence in sequence to enter a sleep mode according to the sleep command. The first node sends the sleep command to the second node, and the second node executes the sleep sequence to enter the sleep mode. The first node sends the sleep command to the first node, and the first node executes the sleep sequence to enter the sleep mode.

According to the electronic device and the operation method of the sleep mode thereof disclosed by the present invention, the first sub-module of the first module sends the sleep command to the second sub-module of the first module, the third sub-module of the second module and the fourth sub-module of the second module, and the second sub-module, the third sub-module and the fourth sub-module execute the sleep sequence in sequence to enter the sleep mode according to the sleep command. The first node sends the sleep command to the second node, and the second node executes the sleep sequence to enter the sleep mode. The first node sends the sleep command to the first node, and the first node executes the sleep sequence to enter the sleep mode. Therefore, the design of the sleep function may be achieved in the electronic device with a complex structure, so as to increase the convenience of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents an element or component that is the same or similar.

Figure 1:
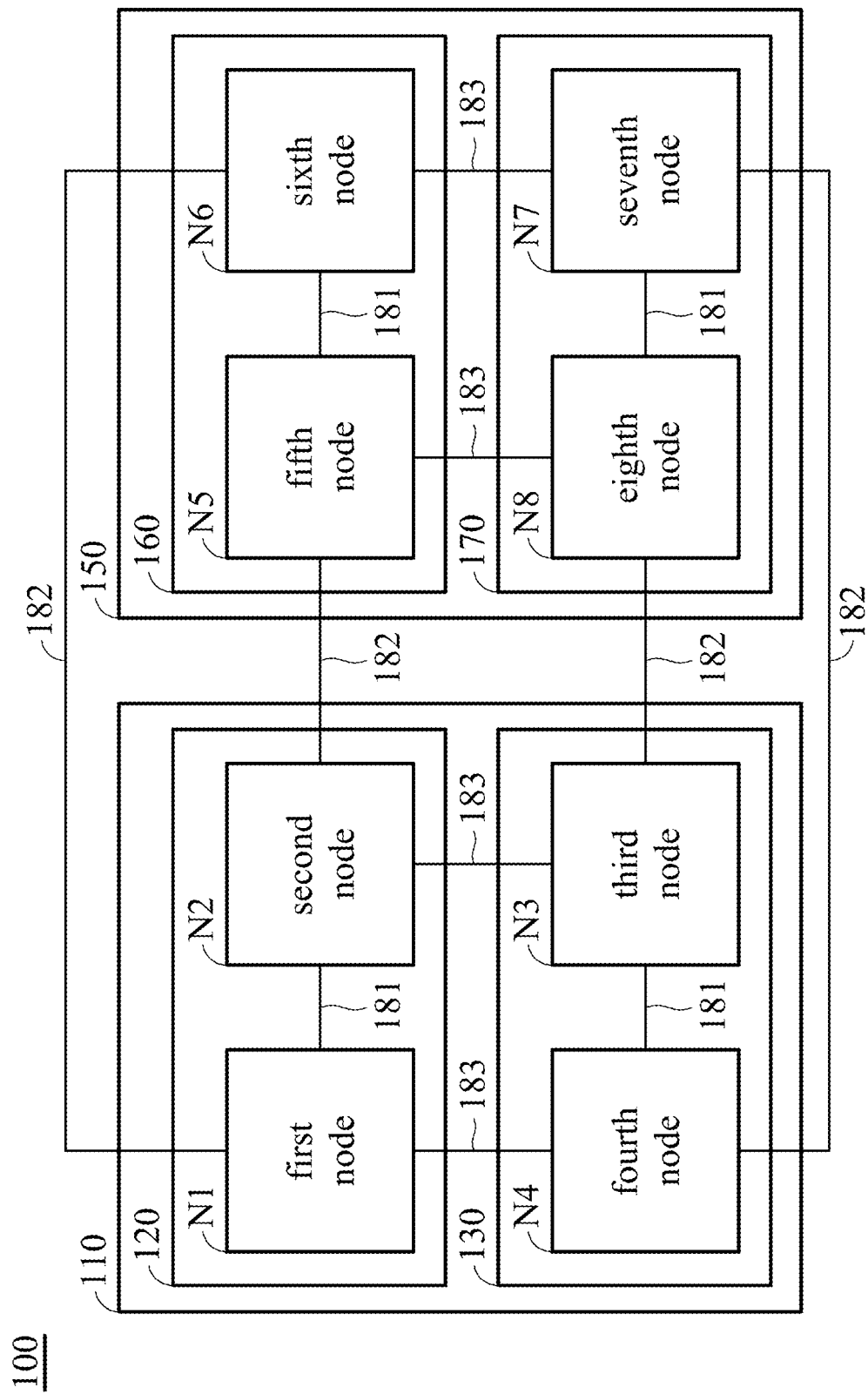
FIG. 1 is a schematic view of an electronic device according to an embodiment of the present invention.

FIG. 1 is a schematic view of an electronic device according to an embodiment of the present invention. Please refer to FIG. 1. The electronic device 100 includes a first module 110 and a second module 150. The first module 110 includes a first sub-module 120 and a second sub-module 130. The first sub-module 120 includes a first node N1 and a second node N2. The second node N2 is connected to the first node N1. The second sub-module 130 includes a third node N3 and a fourth node N4. The third node N3 is connected to the second node N2. The fourth node N4 is connected to the third node N3 and the first node N1.

The second module 150 includes a third sub-module 160 and the fourth sub-module 170. The third sub-module 160 includes a fifth node N5 and a sixth node N6. The fifth node N5 is connected to the second node N2. The sixth node N6 is connected to the fifth node N5 and the first node N1. The fourth sub-module 170 includes a seventh node N7 and an eighth node N8. The seventh node N7 is connected to the sixth node N6 and the fourth node N4. The eighth node N8 is connected to the seventh node N7, the third node N3 and the fifth node N5.

In the embodiment, the first node N1 and the second node N2, the third node N3 and the fourth node N4, the fifth node N5 and the sixth node N6, and the seventh node N7 and the eighth node N8 are respectively connected, for example, through an internal node interconnection (INI) interface 181. That is, the nodes of the same sub-module are connected through the internal node interconnection interface 181.

The first node N1 and the sixth node N6, the second node N2 and the fifth node N5 and the fifth node N3 and the eighth node N8, and the fourth node N4 and the seventh node N7 are respectively connected, for example, through a processor interconnection (PI) interface 182. That is, the nodes of different modules are connected through the processor interconnection interface 182. The first node N1 and the fourth node N4, the second node N2 and the third node N3, the fifth node N5 and the eighth node N8, and the sixth node N6 and the seventh node N7 are respectively connected, for example, through a die interconnection (DI) interface 183. That is, the nodes of different sub-module s of the same module are connected through the die interconnection interface 183.

Figure 2:
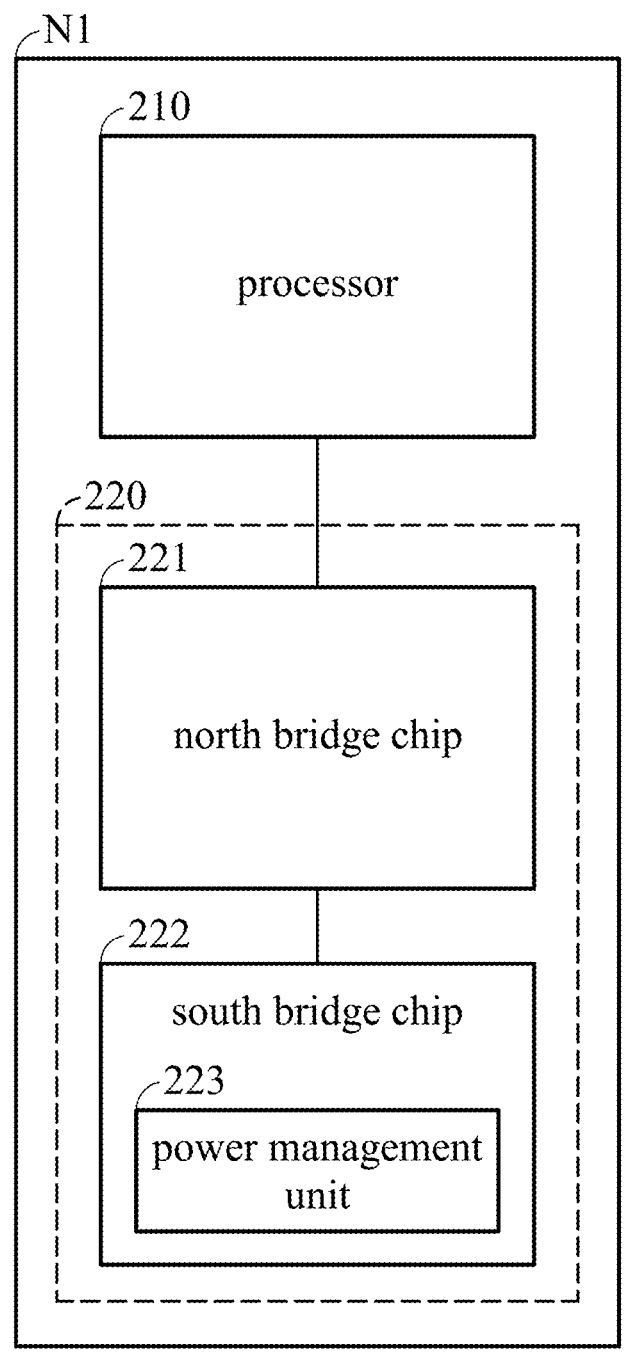
FIG. 2 is a schematic view of a first node according to an embodiment of the present invention.

In the embodiment, the first node N1 may include a processor 210 and a chipset 220, as shown in FIG. 2. In the embodiment, the processor 210 may be a central processing unit (CPU), and the processor 210 may support, for example, eight cores. The chipset 220 is connected to the processor 210. In addition, the chipset 220 includes a north bridge chip 221 and a south bridge chip 222. The north bridge chip 221 is connected to the processor 210. The south bridge chip 222 is connected to the north bridge chip 221. Furthermore, the south bridge chip 222 further includes a power management unit (PMU) 223. The power management unit 223 is used to execute a sleep sequence of the node N1, and may be used to control the power of the electronic device 100 to be turned off or turned on. Moreover, each of the second node N2, the third node N3, the fourth node N4, the fifth node N5, the sixth node N6, the seventh node N7 and the eighth node N8 may also include the processor 210 and the chipset 220, as shown in FIG. 2.

In an operation of the sleep mode of the electronic device 100, the first sub-module 120 may execute an operating system (OS) to set the first module 110 and the second module 150 to enter a device power state. For example, the processor 210 of the first node N1 of the first sub-module 120 may execute the operating system to set all the devices of the first module 110 and the second module 150 (i.e., the first node N1, the second N2, the third node N3, the fourth node N4, the fifth node N5, the sixth node N6, the seventh node N7 and the eighth node N8) to enter the device power state, such as a D3 state defined by an advanced configuration and power interface (ACPI) specification.

Then, the first sub-module 120 may execute the operating system to trigger a system-management interrupt (SMI), and the first sub-module 120 enters a system-management mode (SMM) and executes a system-management interrupt handle, so as to set the second node N2, the third node N3, the fourth node N4, the fifth node N5, the sixth node N6, the seventh node N7 and the eighth node N8. For example, the first sub-module 120 may execute a Wbinvd command and execute a init EXIPI command to transmit a transaction layer package (TLP) to the second node N2, the third node N3, the fourth node N4, the fifth node N5, the sixth node N6, the seventh node N7 and the eighth node N8.

In the embodiment, the first node N1 may transmit the transaction layer package to the second node N2, the fourth node N4 and the sixth node N6. Then, the second node N2 may transmit the transaction layer package to the third node N3 and the fifth node N5, and the fourth node N4 may transmit the transaction layer package to the seventh node N7. Afterward, the third node N3 may transmit the transaction layer package to the eighth node N8. Therefore, the second node N2, the third node N3, the fourth node N4, the fifth node N5, the sixth node N6, the seventh node N7 and the eighth node N8 may ignore a SLP #/DPLSP # signal, and the second node N2, the third node N3, the fourth node N4, the fifth node N5, the sixth node N6, the seventh node N7 and the eighth node N8 may not enter a processor power state during the operation of the sleep mode to avoid generating an error operation, wherein the above processor power state is, for example, a C3 state or a state above C3 defined by the advanced configuration and power interface specification.

The first sub-module 120 may send a sleep command to the second sub-module 130, the third sub-module 160 and the fourth sub-module 170, and the second sub-module 130, the third sub-module 160 and the fourth sub-module 170 execute a sleep sequence in sequence to enter a sleep mode according to the sleep command. For example, the first sub-module 120 may further set a power saving mode of the processor interconnection interface 182 and the die interconnection interface 183, such as a L23 state defined by a peripheral component interconnect express (PCIE) specification.

Then, the first sub-module 120 may query the third node N3, the fourth node N4, the fifth node N5, the sixth node N6, the seventh node N7 and the eighth node N8, so as to determine that the third node N3, the fourth node N4, the fifth node N5, the sixth node N6, the seventh node N7 and the eighth node N8 enter a processor power state. That is, the first node N1 of the first sub-module 120 may query registers of the power management units 223 of the third node N3, the fourth node N4, the fifth node N5, the sixth node N6, seventh node N7 and the eighth node N8, so as to determine that the third node N3, the fourth node N4, the fifth node N5, the sixth node N6, the seventh node N7 and the eighth node N8 enter a C2 state defined by the advanced configuration and power interface specification (such as a lower power state)). When determining that the third node N3, the fourth node N4, the fifth node N5, the sixth node N6, the seventh node N7 and the eighth node N8 enter the C2 state, it indicates that the third node N3, the fourth node N4, the fifth node N5, the sixth node N6, the seventh node N7 and the eighth node N8 will no longer execute any processor (CPU) command.

Afterward, the first sub-module 120 may be blocked from sending a snoop cycle command to the second sub-module 130, the third sub-module 160 and the fourth sub-module 170. That is, the first node N1 may control the first sub-module 120 to be blocked from sending the snoop cycle command to the second sub-module 130, the third sub-module 160 and the fourth sub-module 170, so as to prevent the second sub-module 130, the third sub-module 160 and the fourth sub-module 170 from generating an error operation during the operation of the sleep mode.

Then, the second sub-module 130 may send the first signal S1 to the fourth sub-module 170 and the third sub-module 160 may send the second signal S2 to the fourth sub-module 170 according to the sleep command, and the fourth sub-module 170 executes the sleep sequence to enter the sleep mode, and the fourth sub-module 170 is disconnected from the third sub-module 160 the second sub-module 130. For example, the third node N3 of the second sub-module 130 may send the first signal to the eighth node N8 of the fourth sub-module 170 through the processor interconnection interface 182 and the fifth node N5 of the third sub-module 160 may send the second signal S2 to the eighth node N8 through the die interconnection interface 183, and the eighth node N8 executes the sleep sequence to enter the sleep mode.

Afterward, the fourth node N4 of the second sub-module 130 may send the first signal S1 to the seventh node N7 of the fourth sub-module 170 through the processor interconnection interface 182 and the sixth node N6 of the third sub-module 160 may send the second signal S2 to the seventh node N7 through the die interconnection interface 183, and the seventh node N7 executes the sleep sequence to enter the sleep mode. After the seventh node N7 and the eighth node N8 enter the sleep mode, the fourth sub-module 170 is disconnected from the third sub-module 160 the second sub-module 130. In the embodiment, the eighth node N8 may perform a handshake mechanism with the third node N3 and the fifth node N5, and the seventh node N7 may perform the handshake mechanism with the fourth node N4 and the sixth node N6. That is, after the seventh node N7 and the eighth node N8 enter the sleep mode, the eighth node N8 may provide disconnection indication signals to the third node N3 and the fifth node N5, and the seventh node N7 may provide the disconnection indication signals to the fourth node N4 and the sixth node N6, so as to reflect that the fourth sub-module 170 has been disconnected from the third sub-module 160 and the second sub-module 130.

Figure 3:
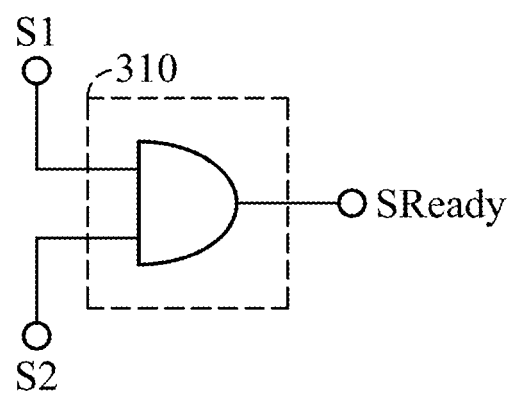
FIG. 3 is a schematic view of a logic component according to an embodiment of the present invention.

In the embodiment, each of the seventh node N7 and the eighth node N8 may include a logic circuit 310 as shown in FIG. 3. The logic circuit 310 receives the first signal S1 and the second signal S2 to generate a sleep-enabling signal SReady. In the embodiment, the logic circuit 310 is, for example, an AND gate or other suitable logic element, but the embodiment of the present invention is not limited thereto. For example, when the logic circuit 310 receives the first signal S1 and the second signal S2, the logic circuit 310 may generate the sleep-enabling signal SReady. When the logic circuit 310 does not receive the first signal S1 and the second signal S2, the first signal S1, or the second signal S2, the logic circuit 310 does not generate the sleep-enabling signal SReady. Then, the sleep-enabling signals SReady may be transmitted to the power management units 223 of the south bridge chips 222 of the seventh node N7 and the eighth node N8, the power management units 223 of the seventh node N7 and the eighth node N8 may execute the sleep sequence according to the sleep-enabling signals SReady, and the seventh node N7 and the eighth node N8 enter the sleep mode.

Afterward, the first sub-module 120 may send the third signal to the third sub-module 160 according to the sleep command, and the third sub-module 160 executes the sleep sequence to enter the sleep mode, and the third sub-module 160 is disconnected from the first sub-module 110. For example, the first node N1 of the first sub-module 120 may send the third signal to the sixth node N6 of the third sub-module 160 through the processor interconnection interface 182, and the sixth node N6 executes the sleep sequence to enter the sleep mode.

Afterward, the second node N2 of the first sub-module 120 may send the third signal to the fifth node N5 of the third sub-module 160 through the processor interconnection interface 182, and the fifth node N5 executes the sleep sequence to enter the sleep mode. After the fifth node N5 and the sixth node N6 enter the sleep mode, the third sub-module 160 is disconnected from the first sub-module 120. In the embodiment, the sixth node N6 may perform the handshake mechanism with the first node N1, and the fifth node N5 may perform the handshake mechanism with the second node N2. That is, after the fifth node N5 and the sixth node N6 enter the sleep mode, the sixth node N6 may provide the disconnection indication signal to the first node N1, and the fifth node N5 may provide the disconnection indication signal to the second node N2, so as to reflect that the third sub-module 160 has been disconnected from the first sub-module 120.

Then, the first sub-module 120 may send the fourth signal to the second sub-module 130 according to the sleep command, and the second sub-module 130 executes the sleep sequence to enter the sleep mode, and the second sub-module 130 is disconnected from the first sub-module 120. For example, the first node N1 of the first sub-module 120 may send the fourth signal to the fourth node N4 of the second sub-module 130 through the die interconnection interface 183, and the fourth node N4 executes the sleep sequence to enter the sleep mode. Afterward, according to the sleep command, the second node N2 of the first sub-module 120 may send the fourth signal to the third node N3 of the second sub-module 130 through the die interconnection interface 183, and the third node N3 executes the sleep sequence to enter the sleep mode. After the third node N3 and the fourth node N4 enter the sleep mode, the second sub-module 130 is disconnected from the first sub-module 120. In the embodiment, the fourth node N4 may perform the handshake mechanism with the first node N1, and the third node N3 may perform the handshake mechanism with the second node N2. That is, after the third node N3 and the fourth node N4 enter the sleep mode, the fourth node N4 may provide the disconnection indication signal to the first node N1, and the third node N3 may provide the disconnection indication signal to the second node N2, so as to reflect that the second sub-module 130 has been disconnected from the first sub-module 120.

Then, the first node N1 may query the sleep state registers of the third N3, the fourth node N4, the fifth node N5, the sixth node N6, the seventh node N7 and the eighth node N8, so as to determine that the third node N3, the fourth node N4, the fifth node N5, the sixth node N6, the seventh node N7 and the eighth node N8 have been entered the sleep mode. After the third node N3, the fourth node N4, the fifth node N5, the sixth node N6, the seventh node N7 and the eighth node N8 enter the sleep mode, the first node N1 is blocked from sending a snoop cycle command to the second node N2, so as to prevent the second node N2 from generating an error operation during the operation of the sleep mode.

Then, the first node N1 may send the sleep command to the second node N2, and the second node N2 executes the sleep sequence to enter the sleep mode. For example, the first node N1 may send the sleep command to the second node N2 through the internal node interconnection interface 181, and the second node N2 execute the sleep sequence to enter the sleep mode. Afterward, the first node N1 may query a sleep state register of the second node N2 to determine that the second node N2 has been entered the sleep mode.

Then, the first node N1 may send the sleep command to the first node N1, and the first node N1 executes the sleep sequence to enter the sleep mode. For example, the first node N1 may send the sleep command to the power management unit 223 of the south bridge chip 222 of the first node N1, and the power management unit 223 executes the sleep sequence and the first node N1 enters the sleep mode. Therefore, All of nodes (such as the first node N1, the second node N2, the third node N3, the fourth node N4, the fifth node N5, sixth node N6, the seventh node N7 and the eighth node N8) of the electronic device 100 may be entered the desired sleep mode, so as to increase the convenience of use.

Figure 4:
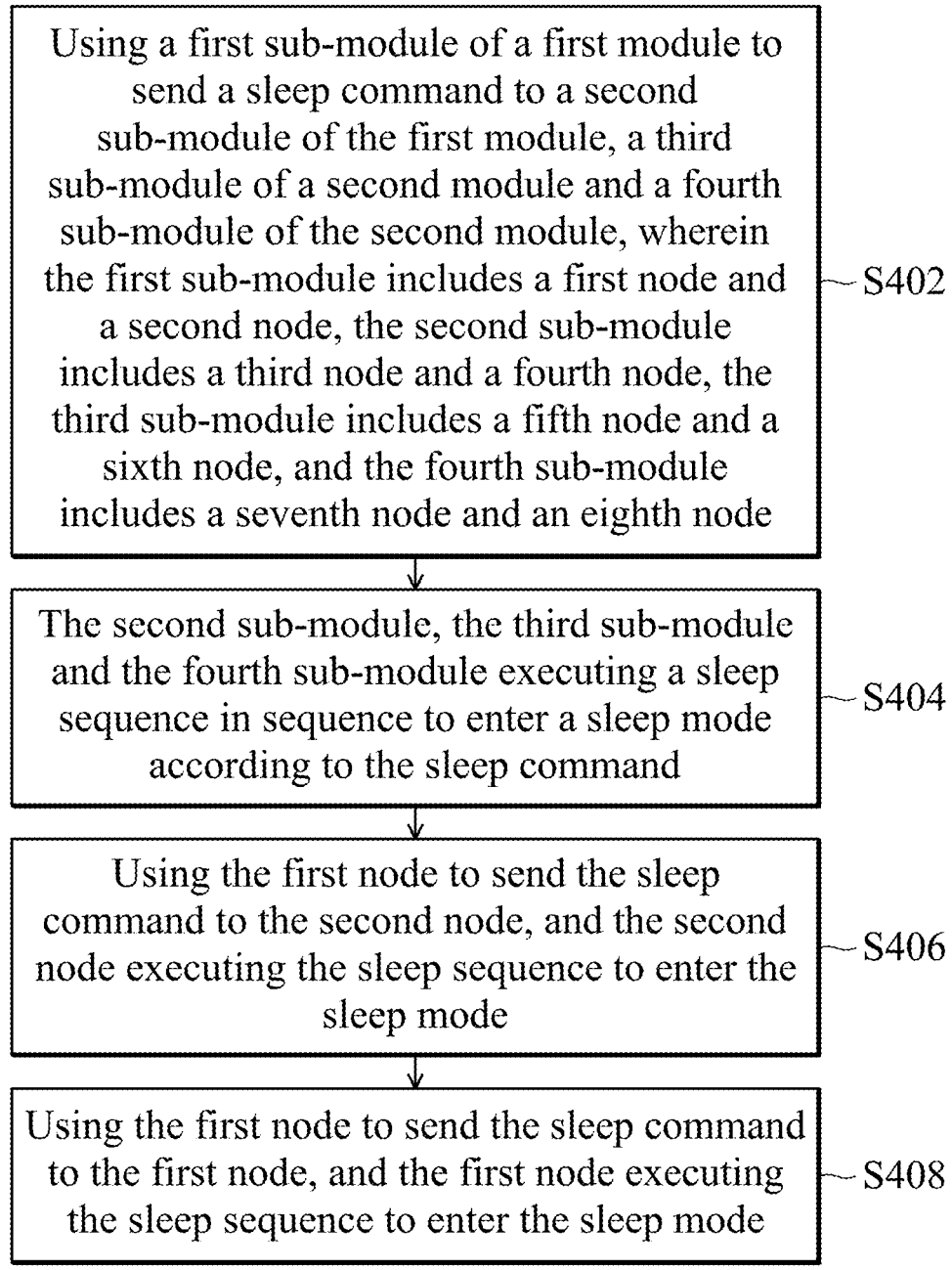
FIG. 4 is a flowchart of an operation method of a sleep mode of an electronic device according to an embodiment of the present invention.

FIG. 4 is a flowchart of an operation method of a sleep mode of an electronic device according to an embodiment of the present invention. In step S402, the method involves using a first sub-module of a first module to send a sleep command to a second sub-module of the first module, a third sub-module of a second module and a fourth sub-module of the second module, wherein the first sub-module includes a first node and a second node, the second sub-module includes a third node and a fourth node, the third sub-module includes a fifth node and a sixth node, and the fourth sub-module includes a seventh node and an eighth node.

In step S404, the method involves the second sub-module, the third sub-module and the fourth sub-module executing a sleep sequence in sequence to enter a sleep mode according to the sleep command. In step S406, the method involves using the first node to send the sleep command to the second node, and the second node executing the sleep sequence to enter the sleep mode. In step S408, the method involves using the first node to send the sleep command to the first node, and the first node executing the sleep sequence to enter the sleep mode. In the embodiment, the first node and the second node, the third node and the fourth node, the fifth node and the sixth node, and the seventh node and the eighth node are respectively connected, for example, through the internal node interconnection interface. The first node and the sixth node, the second node and the fifth node, the third node and the eighth node, and the fourth node and the seventh node are respectively connected, for example, through the processor interconnection interface. The first node and the fourth node, the second node and the third node, the fifth node and the eighth node, and the sixth node and the seventh node are respectively connected, for example, through the die interconnection interface.

Figure 5:
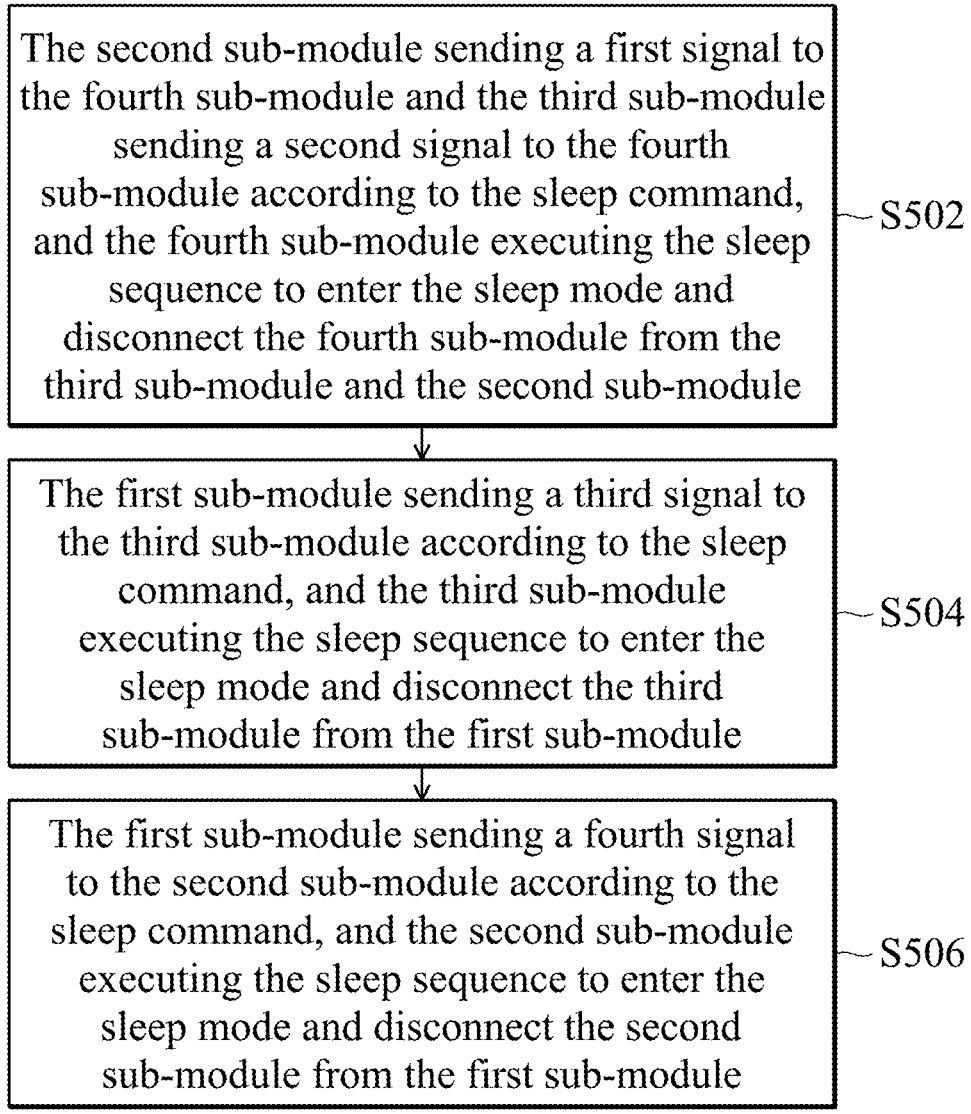
FIG. 5 is a detailed flowchart of step S404 in FIG. 4.

FIG. 5 is a detailed flowchart of step S404 in FIG. 4. In step S502, the method involves the second sub-module sending a first signal to the fourth sub-module and the third sub-module sending a second signal to the fourth sub-module according to the sleep command, and the fourth sub-module executing the sleep sequence to enter the sleep mode and disconnect the fourth sub-module from the third sub-module and the second sub-module.

In step S504, the method involves the first sub-module sending a third signal to the third sub-module according to the sleep command, and the third sub-module executing the sleep sequence to enter the sleep mode and disconnect the third sub-module from the first sub-module. In step S506, the method involves the first sub-module sending a fourth signal to the second sub-module according to the sleep command, and the second sub-module executing the sleep sequence to enter the sleep mode and disconnect the second sub-module from the first sub-module.

Figure 6:
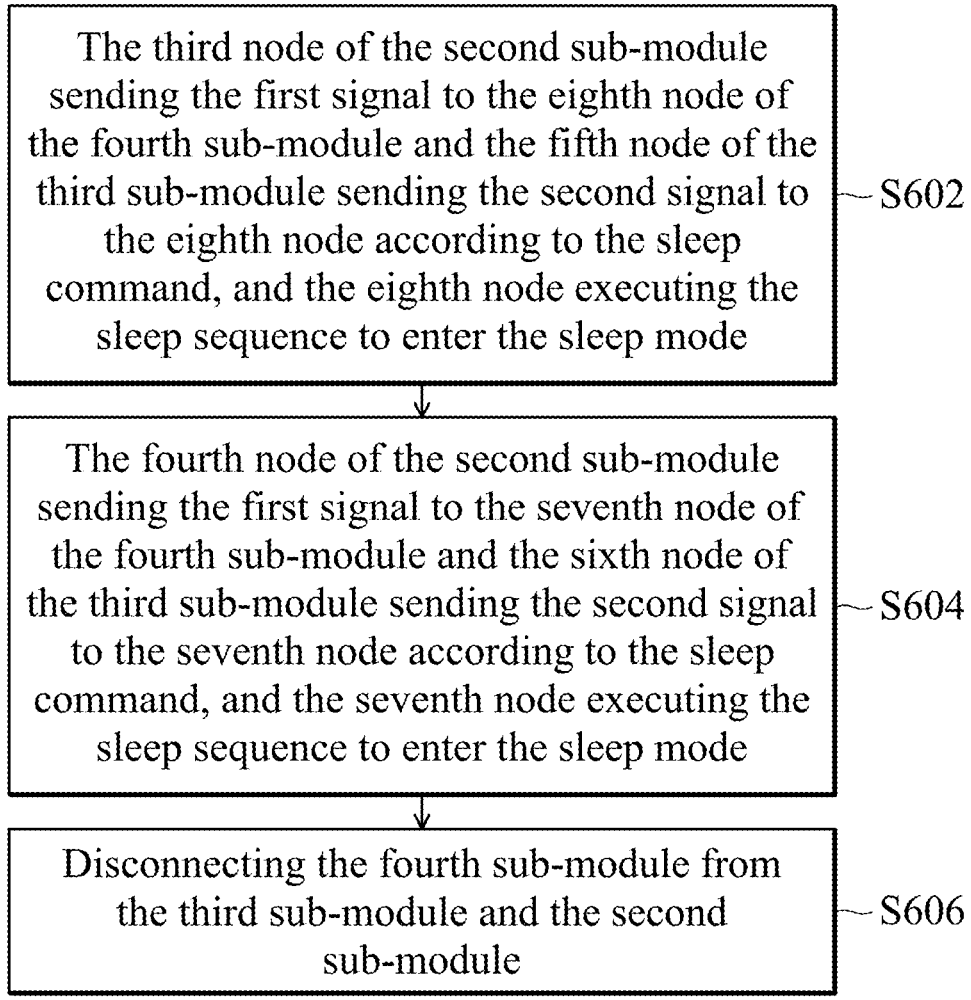
FIG. 6 is a detailed flowchart of step S502 in FIG. 5.

FIG. 6 is a detailed flowchart of step S502 in FIG. 5. In step S602, the method involves the third node of the second sub-module sending the first signal to the eighth node of the fourth sub-module and the fifth node of the third sub-module sending the second signal to the eighth node according to the sleep command, and the eighth node executing the sleep sequence to enter the sleep mode.

In step S604, the method involves the fourth node of the second sub-module sending the first signal to the seventh node of the fourth sub-module and the sixth node of the third sub-module sending the second signal to the seventh node according to the sleep command, and the seventh node executing the sleep sequence to enter the sleep mode. In step S606, the method involves disconnecting the fourth sub-module from the third sub-module and the second sub-module.

Figure 7:
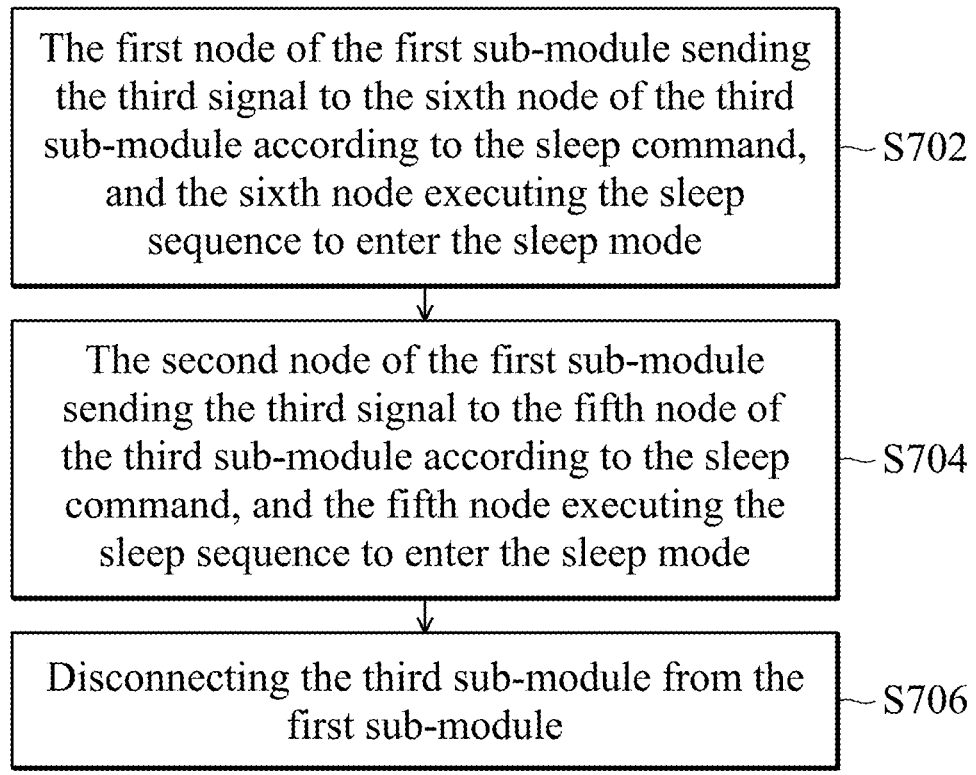
FIG. 7 is a detailed flowchart of step S504 in FIG. 5.

FIG. 7 is a detailed flowchart of step S504 in FIG. 5. In step S702, the method involves the first node of the first sub-module sending the third signal to the sixth node of the third sub-module according to the sleep command, and the sixth node executing the sleep sequence to enter the sleep mode. In step S704, the method involves the second node of the first sub-module sending the third signal to the fifth node of the third sub-module according to the sleep command, and the fifth node executing the sleep sequence to enter the sleep mode. In step S706, the method involves disconnecting the third sub-module from the first sub-module.

Figure 8:
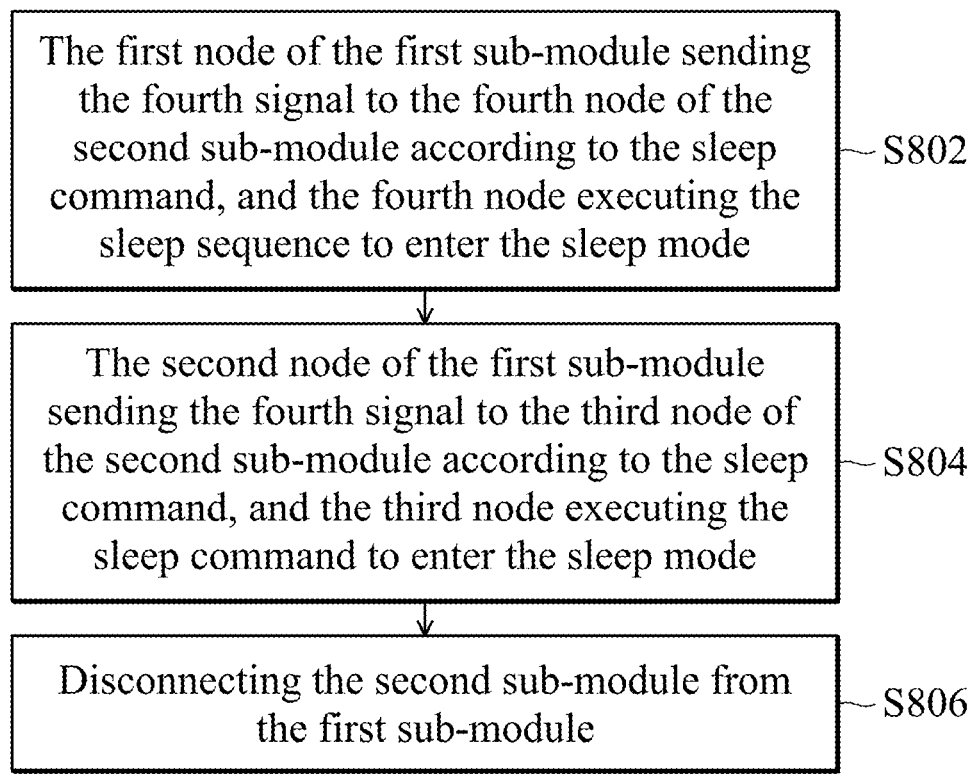
FIG. 8 is a detailed flowchart of step S506 in FIG. 5.

FIG. 8 is a detailed flowchart of step S506 in FIG. 5. In step S802, the method involves the first node of the first sub-module sending the fourth signal to the fourth node of the second sub-module according to the sleep command, and the fourth node executing the sleep sequence to enter the sleep mode. In step S804, the method involves the second node of the first sub-module sending the fourth signal to the third node of the second sub-module according to the sleep command, and the third node executing the sleep command to enter the sleep mode. In step S806, the method involves disconnecting the second sub-module from the first sub-module.

Figure 9:
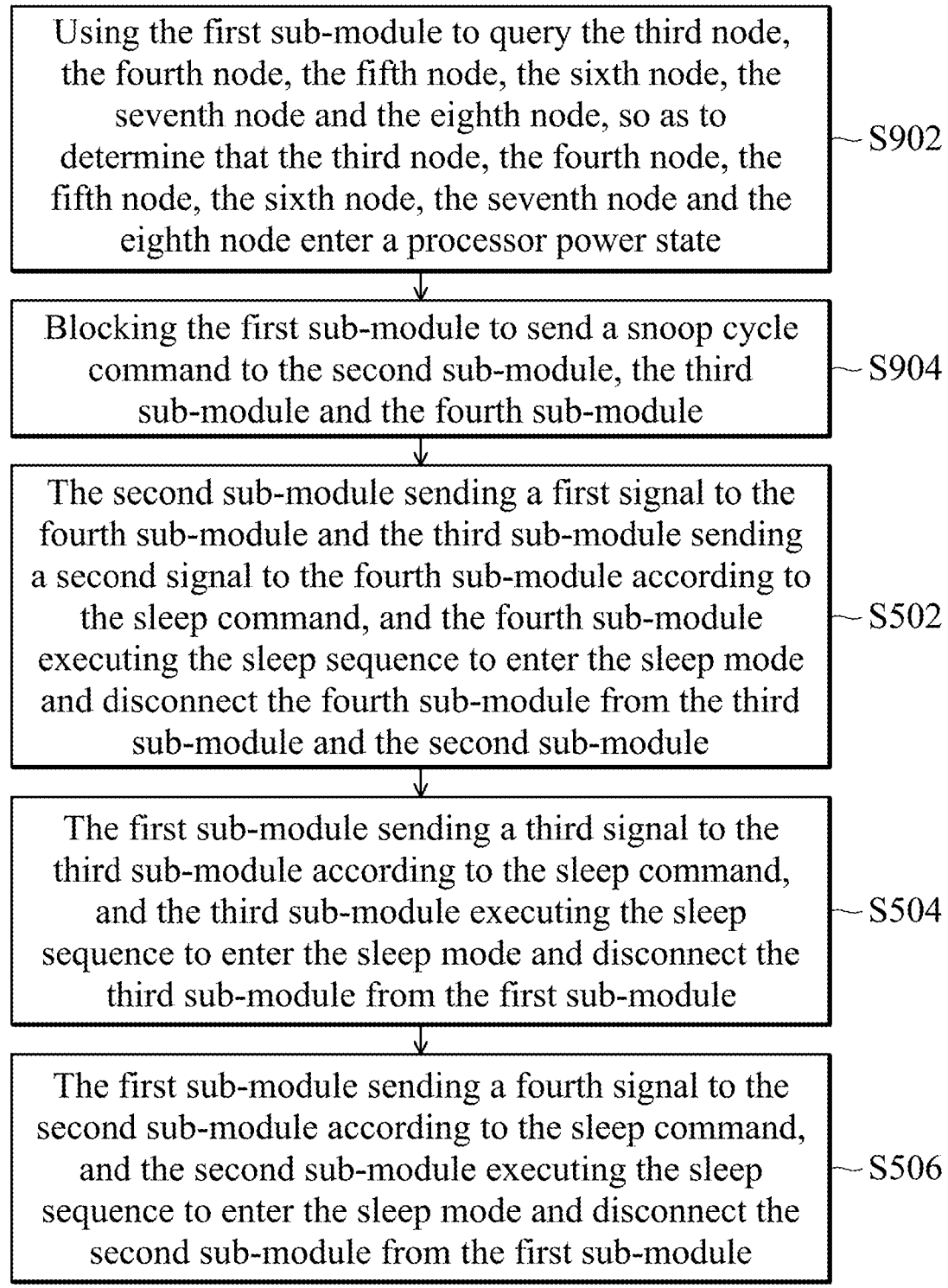
FIG. 9 is another detailed flowchart of step S404 in FIG. 4.

FIG. 9 is another detailed flowchart of step S404 in FIG. 4. In the embodiment, steps S502~S506 in FIG. 9 are the same as or similar to steps S504~S506 in FIG. 5. Steps S502~S506 in FIG. 9 may refer to the description of the embodiment of FIG. 5, and the description thereof is not repeated herein.

In step S902, the method involves using the first sub-module to query the third node, the fourth node, the fifth node, the sixth node, the seventh node and the eighth node, so as to determine that the third node, the fourth node, the fifth node, the sixth node, the seventh node and the eighth node enter a processor power state. In step S904, the method involves blocking the first sub-module to send a snoop cycle command to the second sub-module, the third sub-module and the fourth sub-module.

Figure 10:
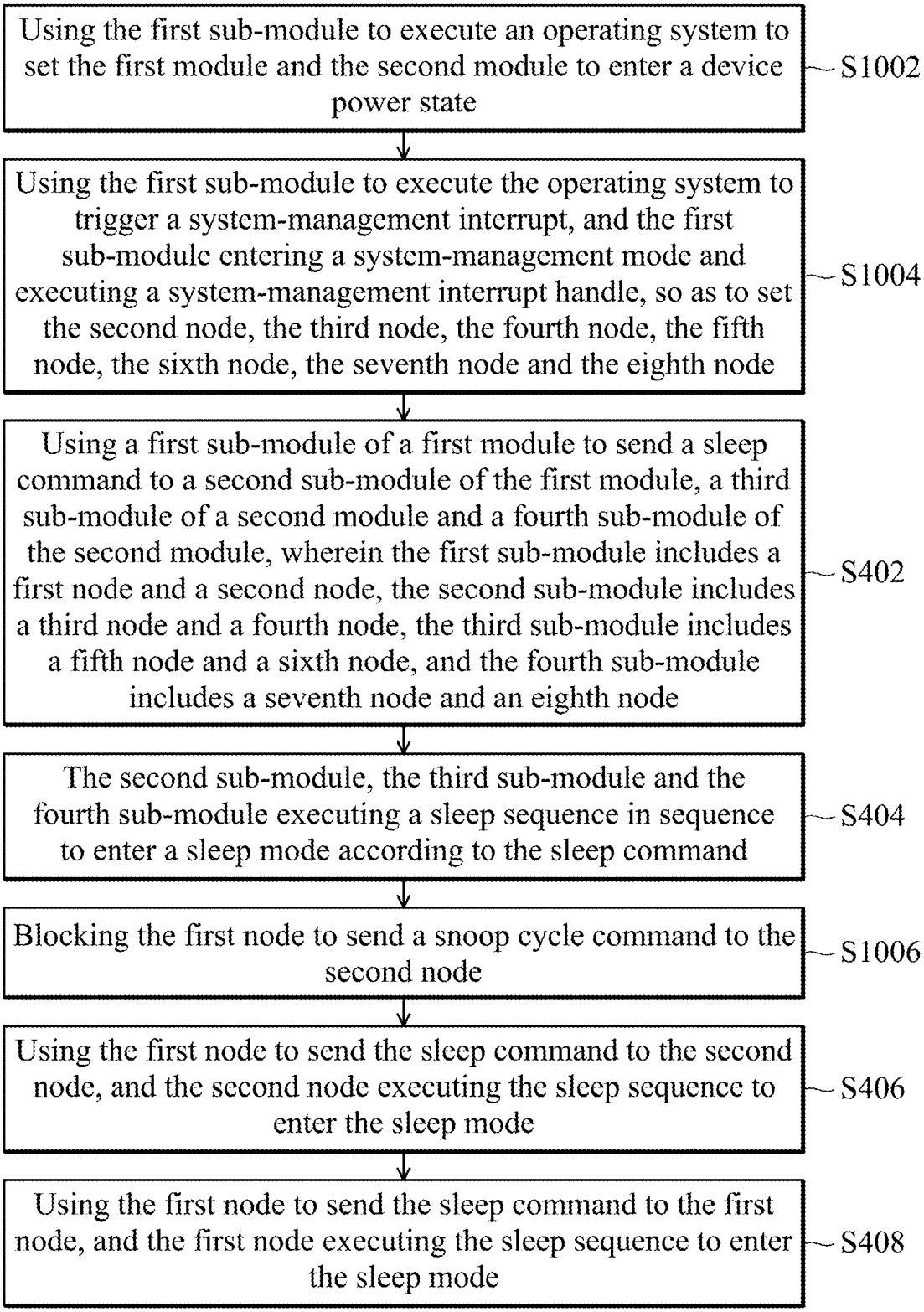
FIG. 10 is a flowchart of an operation method of a sleep mode of an electronic device according to another embodiment of the present invention.

FIG. 10 is a flowchart of an operation method of a sleep mode of an electronic device according to another embodiment of the present invention. In the embodiment, steps S402~S408 in FIG. 10 are the same as or similar to steps S402~S408 in FIG. 4. Steps S402~S408 in FIG. 10 may refer to the description of the embodiment of FIG. 4, and the description thereof is not repeated herein. In step S1002, the method involves using the first sub-module to execute an operating system to set the first module and the second module to enter a device power state. In step S1004, the method involves using the first sub-module to execute the operating system to trigger a system-management interrupt, and the first sub-module entering a system-management mode and executing a system-management interrupt handle, so as to set the second node, the third node, the fourth node, the fifth node, the sixth node, the seventh node and the eighth node. In step S1006, the method involves blocking the first node to send a snoop cycle command to the second node.

It should be noted that the order of the steps in FIG. 4, FIG. 5, FIG. 6, FIG. 7, FIG. 8, FIG. 9 and FIG. 10 is only for illustrative purposes, and is not intended to limit the order of the steps of the present disclosure. The user may change the order of the steps above according the requirement thereof. The flowcharts described above may add additional steps or use fewer steps without departing from the spirit and scope of the present disclosure.

In summary, according to the electronic device and the operation method of the sleep mode thereof disclosed by the present invention, the first sub-module of the first module sends the sleep command to the second sub-module of the first module, the third sub-module of the second module and the fourth sub-module of the second module, and the second sub-module, the third sub-module and the fourth sub-module execute the sleep sequence in sequence to enter the sleep mode according to the sleep command. The first node sends the sleep command to the second node, and the second node executes the sleep sequence to enter the sleep mode. The first node sends the sleep command to the first node, and the first node executes the sleep sequence to enter the sleep mode. Therefore, the design of the sleep function may be achieved in the electronic device with a complex structure, so as to increase the convenience of use.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An operation method of a sleep mode of an electronic device, comprising:
    using a first sub-module of a first module to send a sleep command to a second sub-module of the first module, a third sub-module of a second module and a fourth sub-module of the second module, wherein the first sub-module comprises a first node and a second node, the second sub-module comprises a third node and a fourth node, the third sub-module comprises a fifth node and a sixth node, and the fourth sub-module comprises a seventh node and an eighth node;
    the second sub-module, the third sub-module and the fourth sub-module executing a sleep sequence in sequence to enter a sleep mode according to the sleep command;
    using the first node to send the sleep command to the second node, and the second node executing the sleep sequence to enter the sleep mode; and
    using the first node to send the sleep command to the first node, and the first node executing the sleep sequence to enter the sleep mode.

2. The operation method of the sleep mode of the electronic device as claimed in claim 1, further comprising:
    using the first sub-module to execute an operating system to set the first module and the second module to enter a device power state; and
    using the first sub-module to execute the operating system to trigger a system-management interrupt, and the first sub-module entering a system-management mode and executing a system-management interrupt handle, so as to set the second node, the third node, the fourth node, the fifth node, the sixth node, the seventh node and the eighth node.

3. The operation method of the sleep mode of the electronic device as claimed in claim 1, wherein the step of the second sub-module, the third sub-module and the fourth sub-module executing the sleep sequence in sequence to enter the sleep mode according to the sleep command comprises:
    the second sub-module sending a first signal to the fourth sub-module and the third sub-module sending a second signal to the fourth sub-module according to the sleep command, and the fourth sub-module executing the sleep sequence to enter the sleep mode and disconnect the fourth sub-module from the third sub-module and the second sub-module;
    the first sub-module sending a third signal to the third sub-module according to the sleep command, and the third sub-module executing the sleep sequence to enter the sleep mode and disconnect the third sub-module from the first sub-module; and
    the first sub-module sending a fourth signal to the second sub-module according to the sleep command, and the second sub-module executing the sleep sequence to enter the sleep mode and disconnect the second sub-module from the first sub-module.

4. The operation method of the sleep mode of the electronic device as claimed in claim 3, wherein the step of the second sub-module sending the first signal to the fourth sub-module and the third sub-module sending the second signal to the fourth sub-module according to the sleep command, and the fourth sub-module executing the sleep sequence to enter the sleep mode and disconnect the fourth sub-module from the third sub-module and the second sub-module, comprises:
    the third node of the second sub-module sending the first signal to the eighth node of the fourth sub-module and the fifth node of the third sub-module sending the second signal to the eighth node according to the sleep command, and the eighth node executing the sleep sequence to enter the sleep mode;
    the fourth node of the second sub-module sending the first signal to the seventh node of the fourth sub-module and the sixth node of the third sub-module sending the second signal to the seventh node according to the sleep command, the seventh node executing the sleep sequence to enter the sleep mode; and
    disconnecting the fourth sub-module from the third sub-module and the second sub-module.

5. The operation method of the sleep mode of the electronic device as claimed in claim 3, wherein the step of the first sub-module sending the third signal to the third sub-module according to the sleep command, and the third sub-module executing the sleep sequence to enter the sleep mode and disconnect the third sub-module from the first sub-module, comprises:
the first node of the first sub-module sending the third signal to the sixth node of the third sub-module according to the sleep command, and the sixth node executing the sleep sequence to enter the sleep mode;
the second node of the first sub-module sending the third signal to the fifth node of the third sub-module according to the sleep command, and the fifth node executing the sleep sequence to enter the sleep mode; and
disconnecting the third sub-module from the first sub-module.

6. The operation method of the sleep mode of the electronic device as claimed in claim 3, wherein the step of the first sub-module sending the fourth signal to the second sub-module according to the sleep command, and the second sub-module executing the sleep sequence to enter the sleep mode and disconnect the second sub-module from the first sub-module, comprises:
the first node of the first sub-module sending the fourth signal to the fourth node of the second sub-module according to the sleep command, and the fourth node executing the sleep sequence to enter the sleep mode;
the second node of the first sub-module sending the fourth signal to the third node of the second sub-module according to the sleep command, and the third node executing the sleep command to enter the sleep mode; and
disconnecting the second sub-module from the first sub-module.

7. The operation method of the sleep mode of the electronic device as claimed in claim 3, wherein the step of the second sub-module, the third sub-module and the fourth sub-module executing the sleep sequence in sequence to enter the sleep mode according to the sleep command further comprises:
using the first sub-module to query the third node, the fourth node, the fifth node, the sixth node, the seventh node and the eighth node, so as to determine that the third node, the fourth node, the fifth node, the sixth node, the seventh node and the eighth node enter a processor power state; and
blocking the first sub-module to send a snoop cycle command to the second sub-module, the third sub-module and the fourth sub-module.

8. The operation method of the sleep mode of the electronic device as claimed in claim 1, further comprising:
blocking the first node to send a snoop cycle command to the second node.

9. The operation method of the sleep mode of the electronic device as claimed in claim 1, wherein the first node and the second node, the third node and the fourth node, the fifth node and the sixth node, and the seventh node and the eighth node are respectively connected through an internal node interconnection interface; the first node and the sixth node, the second node and the fifth node, the third node and the eighth node, and the fourth node and the seventh node are respectively connected through a processor interconnection interface; and the first node and the fourth node, the second node and the third node, the fifth node and the eighth node, and the sixth node and the seventh node are respectively connected through a die interconnection interface.

10. An electronic device, comprising:
a first module, comprising:
a first sub-module, comprising:
a first node; and
a second node, connected to the first node; and
a second sub-module, comprising:
a third node, connected to the second node; and
a fourth node, connected to the third node and the first node; and
a second module, comprising:
a third sub-module, comprising:
a fifth node, connected to the second node; and
a sixth node, connected to the fifth node and the first node; and
a fourth sub-module, comprising:
a seventh node, connected to the sixth node and the fourth node; and
an eighth node, connected to the seventh node, the third node and the fifth node;
wherein the first sub-module sends a sleep command the second sub-module, the third sub-module and the fourth sub-module, and the second sub-module, the third sub-module and the fourth sub-module execute a sleep sequence in sequence to enter a sleep mode according to the sleep command, the first node sends the sleep command to the second node, and the second node executes the sleep sequence to enter the sleep mode, and the first node sends the sleep command to the first node, and the first node executes the sleep sequence to enter the sleep mode.

11. The electronic device as claimed in claim 10, wherein the first sub-module executes an operating system to set the first module and the second module to enter a device power state; and the first sub-module executes the operating system to trigger a system-management interrupt, and the first sub-module enters a system-management mode and executes a system-management interrupt handle, so as to set the second node, the third node, the fourth node, the fifth node, the sixth node, the seventh node and the eighth node.

12. The electronic device as claimed in claim 10, wherein the second sub-module sends a first signal to the fourth sub-module and the third sub-module sends a second signal to the fourth sub-module according to the sleep command, and the fourth sub-module executes the sleep sequence to enter the sleep mode and disconnect the fourth sub-module from the third sub-module and the second sub-module; the first sub-module sends a third signal to the third sub-module according to the sleep command, and the third sub-module executes the sleep sequence to enter the sleep mode and disconnect the third sub-module from the first sub-module; and the first sub-module sends a fourth signal to the second sub-module according to the sleep command, and the second sub-module executes the sleep sequence to enter the sleep mode and disconnect the second sub-module from the first sub-module.

13. The electronic device as claimed in claim 12, wherein the third node of the second sub-module sends the first signal to the eighth node of the fourth sub-module and the fifth node of the third sub-module sends the second signal to the eighth node according to the sleep command, and the eighth node executes the sleep sequence to enter the sleep mode; the fourth node of the second sub-module sends the first signal to the seventh node of the fourth sub-module and the sixth node of the third sub-module sends the second signal to the seventh node according to the sleep command, and the seventh node executes the sleep sequence to enter the sleep mode; and the fourth sub-module is disconnected from the third sub-module and the second sub-module.

14. The electronic device as claimed in claim 13, wherein each of the seventh node and the eighth node comprises:

a logic circuit, configured to receive the first signal and the second signal to generate a sleep-enabling signal.

15. The electronic device as claimed in claim 12, wherein the first node of the first sub-module sends the third signal to the sixth node of the third sub-module according to the sleep command, and the sixth node executes the sleep sequence to enter the sleep mode; the second node of the first sub-module sends the third signal to the fifth node of the third sub-module according to the sleep command, and the fifth node executes the sleep sequence to enter the sleep mode; and the third sub-module is disconnected from the first sub-module.

16. The electronic device as claimed in claim 12, wherein the first node of the first sub-module sends the fourth signal to the fourth node of the second sub-module according to the sleep command, and the fourth node executes the sleep sequence to enter the sleep mode; the second node of the first sub-module sends the fourth signal to the third node of the second sub-module according to the sleep command, and the third node executes the sleep command to enter the sleep mode; and the second sub-module is disconnected from the first sub-module.

17. The electronic device as claimed in claim 12, wherein the first sub-module further queries the third node, the fourth node, the fifth node, the sixth node, the seventh node and the eighth node, so as to determine that the third node, the fourth node, the fifth node, the sixth node, the seventh node and the eighth node enter a processor power state, and the first sub-module is further blocked from sending a snoop cycle command to the second sub-module, the third sub-module and the fourth sub-module.

18. The electronic device as claimed in claim 12, wherein the first node is blocked from sending a snoop cycle command to the second node.

19. The electronic device as claimed in claim 10, wherein the first node and the second node, the third node and the fourth node, the fifth node and the sixth node, and the seventh node and the eighth node are respectively connected through an internal node interconnection interface; the first node and the sixth node, the second node and the fifth node, the third node and the eighth node, and the fourth node and the seventh node are respectively connected through a processor interconnection interface; and the first node and the fourth node, the second node and the third node, the fifth node and the eighth node, and the sixth node and the seventh node are respectively connected through a die interconnection interface.

* * * * *